United States Patent [19]

Nikulina et al.

[11] Patent Number: 5,560,790
[45] Date of Patent: Oct. 1, 1996

[54] ZIRCONIUM-BASED MATERIAL, PRODUCTS MADE FROM SAID MATERIAL FOR USE IN THE NUCLEAR REACTOR CORE, AND PROCESS FOR PRODUCING SUCH PRODUCTS

[75] Inventors: Antonina V. Nikulina; Pavel P. Markelov; Vladimir A. Markelov; Mikhail M. Peregud; Anatoly N. Ivanov; Pavel V. Shebaldov, all of Moscow; Anatoly F. Lositsky; Valery A. Dubrovsky, both of Glazov; Jury K. Bibilashvili, Moscow; Vladimir A. Kotrekhov; Nikolai V. Kuzmenko, both of Glazov; Anatoly J. Gusev; Sergei A. Nikulin, both of Moscow; Jury P. Shevnin, Glazov; Valentin K. Shamardin; Andrei E. Novoselov, both of Dimitrovgrad; Mikhail I. Solonin, Moscow, all of Russian Federation

[73] Assignee: A.A. Bochvar All-Russian Inorganic Materials Research Institute, Moscow, Russian Federation

[21] Appl. No.: 335,864

[22] PCT Filed: Jul. 28, 1993

[86] PCT No.: PCT/RU93/00180

§ 371 Date: Nov. 10, 1994

§ 102(e) Date: Nov. 10, 1994

[87] PCT Pub. No.: WO94/23081

PCT Pub. Date: Oct. 13, 1994

[30] Foreign Application Priority Data

Mar. 26, 1993 [RU] Russian Federation ............. 93011504
Jun. 23, 1993 [RU] Russian Federation ............. 93028681

[51] Int. Cl.$^6$ ................. C22C 16/00; C22F 1/18
[52] U.S. Cl. ............................ 148/672; 148/421
[58] Field of Search .................. 420/422; 148/421, 148/672

[56] References Cited

U.S. PATENT DOCUMENTS

| | | | |
|---|---|---|---|
| 5,211,774 | 5/1993 | Garde et al. | 420/422 |
| 5,241,571 | 8/1993 | Pati et al. | 420/422 |
| 5,244,514 | 9/1993 | Garde | 148/421 |

Primary Examiner—Melvyn Andrews
Attorney, Agent, or Firm—Collard & Roe, P.C.

[57] ABSTRACT

The material, according to the present invention, based on a Zr contains also the following components, on a weight percent basis: 0.5 to 1.5 Nb, 0.9 to 1.5 Sn, 0.3 to 0.6 Fe, 0.005 to 0.2 Cr, 0.005 to 0.04 C, 0.05 to 0.15 O, 0.005–0.15 Si, Zr being the remainder. The proposed product used in the core of nuclear reactors and made from the aforementioned material, features a microstructure which is essentially a zirconium matrix strengthened with particles of the stannferous and ferriferous intermetallides; at least 60 volume percent of a total amount of the ferriferous intermetallides falls on the particles of the intermetallides of the type of $Zr(Nb,Fe)_2$, $Zr(Fe,Cr,Nb)$, and $(Zr,Nb)_3Fe$, with the interparticle distance from 0.20 to 0.40 m. The process for producing products used in the core of nuclear reactors and made from the aforementioned material comprises producing an ingot, its preliminary beta-treatment, producing a billet by hot forming of the ingot at an alpha-zirnium existence temperature, annealing the billet at 380° to 650° C., cold forming of the billet involving intermediate annealing procedures at an alpha-zirconium existence temperature, and finishing the billet till obtaining the finished product.

8 Claims, No Drawings

5,560,790

ZIRCONIUM-BASED MATERIAL, PRODUCTS MADE FROM SAID MATERIAL FOR USE IN THE NUCLEAR REACTOR CORE, AND PROCESS FOR PRODUCING SUCH PRODUCTS

TECHNICAL FIELD

The present invention relates in general to the manufacture of products or articles from corrosion-restant alloys used as construction materials of the active core of nuclear reactors, more specifically to a material based on zirconium, products used in the active core of nuclear reactors, and a process for producing such products.

BACKGROUND ARTS

The aforesaid material and product made therefrom are to meet quite a number of requirements as for strength characteristics, corrosion-resistance in water and in high-temperature steam, hydrogenation-proofness, and resistance to radiation growth and to creep. The material should possess high processibility characteristics as being aimed at making, e.g., thin-walled pipes for fuel claddings, spacer grids, and other construction elements of the nuclear reactor core.

Most suitable for the purpose are zirconium-based materials, containing 0.5–1.5 wt. % Nb, 0.9–1.5 wt. % Sn, and 0.3–0.6 wt. % Fe, up to 0.2 wt. % Cr in combination therewith. Said materials, when compared with alloys, wherein the maximum content of the third component is within 0.28 wt. %, feature a higher corrosion resistance, including higher resistance to nodular corrosion, as well as a higher resistance to radiation growth and to creep.

Known in the art is a zirconium alloy (SU, Al, 1,751,222), consisting essentially of the following components on a weight percent basis;

Sn—0.9–1.2

Fe—0.3–0.6

Nb—0.5–1.1

Zr—being the remainder.

The aforesaid alloy features fairly high corrosion-resistance and mechanical properties: tensile strength up to 490–580 MPa (20° C.) and 275–365 MPa (at 350° C.), yield point up to 345–390 MPa (at 20° C.) and 185–245 MPa (at 350° C.) corrosion resistance when exposed to the effect of a steam-and-water mixture at 300° C. irradiation, until formation of fluences $3.7 \cdot 10^{24}$ m$^2$ (3400 h) and $1 \cdot 10^{25}$ m$^{-2}$ (7840 h) in terms of weight gain) up to 30–40 mg/sq dm and 80–95 mg/sq dm, respectively, and a rate of creep at 350° C. and under a lead of 100 MPa up to $(1.3–3.6) \cdot 10^{-5}$%/h.

The alloy in question, however, is featured by liability to form a banded arrangement of large-size particles (up to 1.5 m) of a fairly stable intermetallide enriched in iron (ZrFe$_3$) in the ingot and at early stages of its processing, which leads during plastic working of this alloy with high reduction ratios, to origination of microcracks at the places of aggregation of such particles. To eliminate large-size particles in the alloy structure involves beta-treatment of an ingot with prolonged holding periods at high temperatures, with the resultant higher metal consumption due to an increased thickness of the gas-saturated layer being removed and hence higher cost of finished products.

Furthermore, despite the use of beta-treatment, rather large (up to 1.0 m) particles of the ferriferous intermetallides (ZrFe$_3$ inclusive) are reestablished in the structure of finished products made of said alloy, with the result that a total density of particles in the alpha-zirconium matrix is noticeably reduced. This can be explained by a high tendency of such intermetallides to coagulation at the temperatures of recrystallization alpha-annealing between the stages of multiply repeated cold straining which are applied when making products from said alloy. Presence of large particles of intermetallides featuring a reduced distribution density in the matrix affects adversely corrosion resistance and breaking strength characteristics of the material the product is made of.

Known in the art are a zirconium alloy for making components for light-water reactors and a method for its treatment with a view to attaining a definite creep level thereof (U.S. Pat. No. 5,125,985).

Said alloy consists essentially of, on a weight percent basis;

0.5 to 2.0 Nb;

0.7 to 1.5 Sn;

0.07 to 0.28 of at least one metal selected from the group consisting of the group of elements incorporating Fe, Ni, and Cr;

up to 220 mln$^{-1}$ C;

the remainder being Zr.

Use is made in said method of beta-annealing following extrusion, a number of intermediate reductions of the product cross-sectional area and of intermediate recrystallization alpha-annealings, followed by final reduction of the product cross-sectional area and its finish annealing for stress relieving. The essence of the method consists in finding an optimum combination of a degree of cross-sectional areas reduction and an intermediate annealing temperature following such a cross-sectional reduction at the stage of cold working. Beta-hardening can be reserted to at the final stage following cold working.

The process is capable of producing the products having a constant rate of creep at 385° C., as well as those with a 10°–190° reduction of their cross-sectional area.

However, products made from said alloy suffer from an inadequately broad range of anticorrosive properties, including too low resistance to nodular corrosion in boiling water. This is mainly due to the fact that, on account of a relatively low content of the third component which is a rule Fe, there cannot be obtained a definite qualitative and quantitative composition of the second-phase particles and a required density of their distribution, which ensure in combination a high level of anticorrosive and mechanical properties, since a considerable proportion among the second-phase particles is made by particles reach mainly in Nb, whereas the ferriferous intermetallides that determine the anticorrosive and mechanical properties of the product are formed in a small amount and feature a large interparticle distance (more than 0.50 m).

Further on, when using the treatment method proposed before one cannot attain in the product a combination of high creep resistance, crack-resistance, and corrosion resistance, including alloys having a higher Fe content, i.e., from 0.3 to 0.6 wt. %. This can be explained by the fact that one cannot attain a high degree of homogeneity of the alloy matrix granular structure with the second-phase finely divided particles (under 0.1–0.2 m) uniformly distributed therein In case of mechanical treatment without beta-hardening at the stage of cold working of an ingot it is second-phase particles sized 0.1–0.4 m that are mainly present in the alloy structure, which fails to provide an adequately high corrosion resistance of the alloy. Apart from that, with such a treatment one cannot avoid the presence of sporadic large-size (up to 1.5 m) segregates of intermetallide of the $ZrFe_3$ type which, when turning into aggregations, affect badly the toughness and crack resistance of the material. Application of beta-hardening at the final stage of cold working prevents formation of large intermetallides in the alloy structure; however, once-through cold straining and posthardening annealing are not sufficient for eliminating the "inherited" banded arrangement (lineage) of the second-phase segregates and attaining, as a whole, a homogeneous fine-grained structure featuring a steady high level of corrosion resistance and breaking strength. In addition, the material in question (especially high Fe-content alloys) has a reduced reserve of technological plasticity after beta-hardening at the final stage of cold working, this being due to hardening stresses, which prevent the use of high degrees of cold straining at the final stage of cold working and places substantial limitation upon a practicabiity of the aforesaid method to products featuring a high cross-sectional reduction ratio at the final stage of cold working.

One state-of-the-art zirconium-based material and a process for producing articles therefrom is known to be disclosed in U.S. Pat. No. 4,649,023. The material contains, on a weight percent basis: 0.5–2.0 Nb; 0.9–1.5 Sn; 0.09–0.11 of a third component selected from the group consisting of Fe, Cr, Mo, V, Cu, Ni, and W, Zr being the remainder.

The process for producing articles from said material consists of the following stages:

making an ingot and its plastic working to produce a blank or workpiece;

beta-treatment (hardening) of the blank;

initial mechanical treatment of the blank at a temperature below 650° C.;

mechanical treatment be a multistage cold working at a temperature below 650° C.;

annealing between the cold working stages at 500°–650° C.;

finish annealing at a temperature below 650° C.

The process under consideration provides for a uniform distribution of the second-phase particles having an average size below 800 Å in the microstructure of the material, which renders it corrosion-resistance and resistant to saturation with hydrogen in a medium of high-temperature steam in nuclear reactors.

However, density of second-phase Fe-containing particles is inadequate, due to too a low content of a third component in said material, in order to impart a higher corrosion-resistant property thereto.

Furthermore, said process is applicable only for producing articles from zirconium-based materials, containing not over 0.25 wt. % of a third component, whereas the use of said process for producing articles from said material containing a higher weight percent of a third component (0.3 to 0.6) results in a higher percent of reject for microcracks after a first cold rolling procedure with an adequately high reduction ration applicable in rolling practice. This can be explained by a reduced technological plasticity of the material due to a high level of residual hardening stresses therein resulting from beta-annealing followed by a high-rate cooling carried out prior to cold-rolling procedures.

Practising a first cold-rolling operation with low reduction ratios, for fear of cracking of the material, necessitates carrying out a great number of cold working operations with intermediate annealing operations, which makes the process much less economic. Moreover, in this case the anticorrosive and mechanical properties of the material are also impaired due to formation of a less fine-grained and less homogeneous structure in the material of the product, featuring larger segregates of the second-phase particles having an interparticle distance on the order of 0.45–0.50 m. This is concerned with the fact that in this case an intermediate annealing is conducted at a higher temperature and for a longer period of time, which leads ultimately to a growth of the grain and of the second-phase particles.

DISCLOSURE OF THE INVENTION

It is a primary and essential object of the present invention to provide a zirconium-based material, an article made of said material and used in the core of nuclear reactors, and process for producing said articles which due to formation of a definite microstructure therein will impart a higher property of corrosion resistance, breaking strength and resistance to radiation growth and creep.

The aforestated is practicable, first, due to elimination of the liability of a high Fe-content material to form large particles of intermetallides, and secondly, due to an increased reserve of technological plasticity before performing the stage of cold rolling, which makes it possible to use adequately high amounts of reduction at the initial stages of cold working. Thus, in turn, the latter factor adds to the structural homogeneity of the material and contributes to formation of a definite composition, particle size distribution and uniform distribution of the second-phase particles in the zirconium matrix of the alloy, with the result that there are ensured higher performance characteristics of the articles produced, including resistance to corrosion in a medium of high-temperature steam, breaking strength, and resistance to radiation growth and creep.

The foregoing object is accomplished by the provision of a zirconium-based material, containing Nb, Sn, Fe, Cr, C, O, and Si and having a microstructure incorporating particle of the stanniferous and ferriferous intermetallides, said material, according to the invention, consisting essentially of, on a weight percent basis:

0.5–1.5 Nb, 0.9–1.5 Sn, 0.3–0.6 Fe, 0.005–0.2 Cr, 0.005–0.04 C, 0.05–0.15 O, 0.005–0.15 Si, and the remainder being Zr, said microstructure of the material incorporating particles of the ferriferous intermetallides of the type of $Zr(Nb,Fe)_2$, $Zn(Nb,Cr,Fe)$, $Zr,Nb)_3Fe$, the sum of which is equal to or in excess of 60 vol. % of a total content of the ferriferous intermetallides, the interparticle distance being from 0.20 to 0.40 m.

The presence of said components in said amount provides for, in the course of producing particles from said material, formation of the second-phase particles in an alpha-zirconium matrix, of the following intermetallides: $Zr(Nb,Fe)_2$ $Zn(Fe,Cr,Nb)$, $(Zn,Nb)_3Fe$, which determine high anticorrosive and mechanical properties of the finished articles. In this case the proportion of such particles in a total amount of the ferriferrous segregates of the second phase is 60 vol. % and over, and the distance between said particles is from 0.20 to 0.40 m.

A dope of Cr to the material with the Fe content of from 0.3 to 0.6 wt. % conduces to size reduction of the intermetallide particles in the ingot structure and at early stages of its processing due to binding a considerable proportion of Fe into intermetallide containing Zr, Fe, and Cr, the particles of which are much less in size than the particles of the $ZrFe_3$ type forming in the material in the absence of Cr. As a result, there is not need for prolonged high-temperature holdings in the course of beta-treatment. A higher Fe content of the material imparts to the finished article of required composition and the amount of the ferriferous intermetallides, such as $Zr(Nb,Fe)_2$, $Zr(Nb,Cr,Fe)$, $(Zr,Nb)_3Fe$, which determine high anticorrosive and mechanical properties of the article. Si and C contribute to further grain size reduction and add to homogeneity of the structure of the material. Oxygen also reduces the size of the structure grains and is also used as a solid-solution strengthening agent.

All the aforelisted factors involved in producing, according to the invention, articles from the proposed material for use 8in the core of nuclear reactors, promote formation of a homogeneous fine-grained alpha-zirconium matrix in the finished product, featuring uniformly distributed therein particles of ferriferous intermetallides, the majority of which are sized below 0.1 m with an interparticle distance if from 0.20 to 0.40 m and not less than 60 vol. % of the total number of particles are intermetallides of the type of $Zr(Nb,Fe)_2$, $Zr(Nb,Cr,Fe)$, $(Zr,Nb)_3Fe$.

The presence of such a structure in articles made of a given alloy imparts high corrosion resistance thereto, including higher resistance to modular corrosion, high plasticity and breaking strength, and increased resistance to radiation growth and creep.

The foregoing object is accomplished also due to the provision of a process for producing articles used in the core of nuclear reactors, from a zirconium-based material, containing also Nb, Sn, Fe, Cr, C, O, and Si, said method comprising making an ingot, preliminary beta-treatment of said ingot, producing a blank by hot ingot forming at an alpha-zirconium existence temperature, cold forming of a blank involving intermediate annealings at a alpha-zirconium existence temperature, and bringing the blank to a finished article, wherein, according to the invention, use is made of a material consisting of the following components, on weight percent basis:

0.5–1.5 Nb,
0.9–1.5 Sn,
0.3–0.6 Fe,
0.005–0.2 Cr,
0.005–0.004 C,
0.05–0.15 O,
0.005–0.15 Si, and
the remainder being Zr, said hot ingot forming at an alpha-zirconium existence temperature being followed by annealing the blank at 380° to 650° C.

Practical application of the herein-proposed process provides for an increase in the reserve of technological plasticity of the material due to establishing, in the course of said alpha-annealing, a matrix structure featured by more equilibrium and a higher degree of homogeneity from the viewpoint of recrystallization, as well as by a lower density of dislocations. Concurrently with the alpha-zirconium matrix recrystallization process, the second-phase particles of the type of $Zr(Nb,Fe)_2$, $Zr(Nb,Cr,Fe)$, $(Zr,Nb)_3Fe$ start forming. This makes it possible to effect cold blank forming at the initial stages, involving higher amounts of reduction. A higher amount of reduction of metal at the first stage of cold working contributes to reduction of the temperature of incipient recrystallization of the granular structure during subsequent intermediate annealing due to an increased amount of activation energy accumulated during the cold working process. Such a situation makes it possible to carry out an intermediate annealing between the cold working steps at a lower temperature which decelerates the growth of the second-phase particles of another type (e.g., $ZrFe_3$) during the annealing process. This also conduces to formation of the second-phase particles of the type of $Zn(MbFe)_2$, $Zn(Nb,Cr,Fe)$, and $(ZnNb)_3Fe$ in an amount of 60 vol. % and over of a total amount of ferriferrous intermetallides, as well as to a more dispersed distribution of the second-phase particles over the volume of the shaped article. This in turn tells favorably on the performance characteristics of the shaped article, such as corrosion resistance, plasticity, and breaking strength.

Moreover, an increased degree of reduction at the initial stages of cold working of a billet adds to production effectiveness of the process and renders it more economic, thus making the process applicable to a wide range of zirconium-based materials and articles made therefrom.

It is desirable that the billet, after having been passed the beta-treatment, be annealed at 380°–650° C. before being subjected to hot reduction. Such an annealing relieves hardening stresses, reduces and equalizes dislocation density over the billet cross-sectional area and brings the material to a more equilibrium state, which adds substantially to its reserve of plasticity and toughness. As a result of such annealing the hot reduction process can be effected with a higher degree of drawing and at a lower temperature. Application of the abovesaid annealing is especially important for materials having a Fe-content of 0.3–0.6 wt. %, since an increase in the Fe-content of the material by 0.1 wt. % temperature of transition of the alpha+beta structure to the alpha-structure drops by about 15° C. That is why the proposed annealing that follows the beta-treatment makes possible hot reduction with high degrees of drawing at a lower temperature, which renders the proposed process more versatile.

It is expedient that the billet, after having been subjected to hot reduction, be exposed to beta-hardening at temperatures from 900° to 1100° C. before alpha-annealing at 380° to 520° C.

With such a combination of beta-hardening and alpha-annealing after hot reduction a high reserve of technological plasticity of the material is attained. In addition, cold reduction of the blank at an initial stage can be effected with high degree of reduction. Use of said beta-hardening followed by alpha-annealing before cold blank reduction results to a more finely dispersed distribution of the second-phase particles in the blank matrix. This is attained due to the fact that beta-hardening dissolved completely intermetallides and other second-phase particles that have been formed at early stages of the cold-rolling process. Subsequent alpha-annealing at 380°–520° C. relieves hardening stresses, reduces dislocation density in the matrix as a result of the polygonization process but causes non re-formation of intermetallides and other second-phase particles from beta-zirconium interlayers interposed between the plates of the hardened martensitic-type structure. The interlayers retain their shape and remain adequately plastic, while modifying only their microstructure. Such a hardened-and-annealed laminated structure has a substantially higher reserve of toughness compared with the structure obtained after beta-hardening without alpha-annealing, which makes it possible to perform cold blank reduction with higher amounts of reduction. As a result of cold reduction the beta-circonium interlayer of the hardened-and-annealed structure of the material extend towards the direction of rolling, thus getting thinner and partly becoming split into fragments in the most stressed areas. Subsequent annealing result in formation of finer second-phase particles from said thin interlayers, mainly of the type of $Zr(Nb,Fe)_2$, $Zr(Nb,Cr,Fe)$, and $(Zr,Nb)_3Fe$ and in a greated number. The greater the cold reduction ratio the thinner layers can be obtained and the lower annealing temperature can be used, thus avoiding particle growth. Thus, the finished product features the content of the finely-divided particles of said type of 60 vol. % and more of a total amount of the ferriferous second-phase particles and are uniformly distributed with a high density in the matrix metal of the finished product. Such a microstructure possesses higher plasticity, breaking strength, and corrosion resistance.

It is also desirable that beta-hardening be conducted at a rate of from 60° C./s to 100° C./s In this case there is formed a more finely dispersed structure featuring narrow plates of the nonequilibrium alpha-zirconium phase, between which are interposed thinner interlayers of the beta-zirconium phase from which are formed intermetallides and other second-phase particles during subsequent cold-working operations involving intermediate annealing procedures. The smaller the plates and the thinner the interlayers the finer the second-phase particles being formed, the shorter the interparticle distance and hence the higher the density of such particles. More finely dispersed and more uniformly distributed second-phase particles in the matrix metal of the finished product leads to higher plasticity, breaking strength, and corrosion resistance.

BEST MODE FOR CARRYING OUT THE INVENTION

The process for producing such articles, as, e.g., pipes used in the core of nuclear reactors, from a zirconium-based material is carried into effect as follows.

An ingot from a material containing (wt. %): 0.5–1.5 Nb, 0.9–1.5 Sn, 0.3–0.6 Fe. 0.005–0.2 Cr, 0.005–0.04 C. 0.05–0.15 O, and 0.005–0.13 Si, Zr being the remainder is produced by, e.g., the vacuum-arc remelting process.

Presence of said components taken in said ratio provides high level of corrosion resistance, breaking strength, and resistance to radiation growth and creep to articles produced. Used as the base of the material is Zr which has a low neutron-capture cross-sections and has therefore found most extensive use in nuclear power engineering.

An adds to corrosion resistance of Zr and mainly provides a required level of breaking strength, creep resistance, and other performance characteristics for the latter.

A higher Fe content of the articles provides a required composition and amount of ferriferous intermetallides, such as $Zr(Nb,Fe)_2$, $Zr(Fe,Cr,Nb)$, $(Zr,Nb)_3Fe$ which determine high anticorrosive and mechanical properties of the article.

Additives of Cr to a higher Fe-content material contributes to size reduction of the intermetallide particles in the ingot structure and at early stage of its processing. As a result, there is no need for prolonged high-temperature holdings during beta-treatment.

Si and C contributes to size reduction of particles and add to structural homogeneity of the material.

Oxygen contributes to a finer structure of the material and also is used as a solid-solution strengthener.

Nb adds to the strength characteristics of Zr and, while forming, together therewith and with Fe, finely divided second-phase particles in the Zr matrix, increases its corrosion resistance.

With the Nb content of the material below 0.5 wt. % its Fe content below 0.3 wt. %, and the Cr content below 0.005 wt. %, the total proportion of intermetallides of the type of $Zr(Nb, Fe)_2$, $Zr(Nb,Cr,Fe)$, and $(Zr,NB)_3Fe$ in the alpha-zirconium matrix of the final product is substantially lower than 60 vol. % of a total amount of the second-phase ferriferous particles, with the result that corrosion resistance of the material is badly affected. With the Nb content of the material above 1.5 wt. %, a great number of large-size particles of the beta-niobium phase are formed in the material, which reduces its corrosion resistance, too.

The Fe content of the material in excess of 0.6 wt. % results in formation of agglomerates of large-size particles of an intermetallide of the type of $ZrFe_3$, and unnecessary coagulation of other ferriferous second-phase particles with an interparticle distance below 0.20 m. As a result, the material becomes less processable during cold working processes and has a lower breaking strength in a final product.

With the Cr content of the material above 0.2 wt. % may result in formation of binary Zr—Cr intermetallides therein, which affects adversely processiblity and breaking strength of the material.

Too a low Sn content (below 0.9 wt. %) of the material affects both short- and long-time breaking strength thereof. Besides, such a low Sn content suppresses to a lower extent a harmful effect of possible N admixture on corrosion resistance of the material. Should the Sn content of the material be in excess of 1.5 wt. %, this affect noticeably amenability of the material to hot and especially cold press working.

Too a low oxygen content of the material (below 0.05 wt. %) virtually fails to provide solid-solution strengthening of the alpha-zirconium matrix, while an oxygen content above 0.15 wt. % affects processiblity of the material.

The Si content of the material below 0.005 wt. % is inadequate for dispersing and increasing the homogeneity of a cast structure of the material, since in this case a coarse-laminated structure is largely formed, which tells negatively on anticorrosive and mechanical properties of the final product. When the Si content exceeds 0.15 wt. %, Si intermetallides are formed in the material, which affects adversely its processibility, as well as crack-resistance and corrosion-resistance characteristics of the final product.

Too a low C content (below 0.005 wt. %) of the material reduces corrosion resistance thereof, whereas the C content in excess of 0.04 wt. % results in formation of excess zirconium carbide which like silicon intermetallides affects processibility and breaking strength of the material.

Once melted the ingot is subjected to mechanical beta-treatment, e.g., under pressure at 1070° to 900° C. to attain approximately a fivefold reduction of the ingot diameter. Then the plastic-worked ingot is heated to, e.g., 1050° C. and water-quenched. Once the gas-saturated superficial layer of the blank has been removed, the blank is annealed at a temperature of from 380° to 650° C. The annealing results in about twice as high impact toughness of a hardened blank due to relieving hardening stresses, reduced and equalized dislocation density over the blank cross-sectional area and partial transformation of the laminated structure with the resultant areas of elongated polygonized grains of the alpha-zirconium phase. Concurrently with the structural change in the matrix metal there appear lines of intermetallide particles, including those of the type of $Zr(NbFe)_2$, $Zr(Fe,Cr,Nb)$, and $(ZrNb)_3Fe$ that have been formed from interlayers of the residual beta-zirconium phase.

Annealing at a temperature below 380° C is inadequate for substantial structural changes in the alloy aimed at a required increase in the reserve of technological plasticity; annealing at a temperature above 650° C. results in additional formation of the residual beta-zirconium phase in alloys with increased content of the third component, e.g., Fe, which is due to falling into the region of the alpha-plus-beta structure, resulting in formation of large intermetallide particles that deteriorate plasticity, breaking strength, and corrosion resistance of the material the product is made from.

Then the annealed blank is subjected to hot working (e.g., press forming) at an alpha-zirconium existence temperature, for instance, 620° C. accompanied by drawing ( ) performed from 5 to 12 times to make a pipe billet.

Next the pre-formed pipe billet is subjected to beta-hardening at a temperature of from 900° to 1100° C. at a quenching rate of from 60° C./s to 1000° C./s As a result of beta-hardening the martensitic-type structure is formed with plates of the nonequilibrium alpha-zirconium phase 0.4 to 1.5 m wide and narrow interlayers of the residual beta-zirconium phase having a transverse dimension up to 0.1 m, while the intermetallide particles that have been found earlier are dissolved upon being heated and held before hardening. Such a laminated structure resulting from beta-hardening is featured by the impact toughness values in the range of from 80 to 120 $kJ/m^2$.

Hardening from a temperature below 900° C. fails to form a homogeneous fine-laminated structure because when heated before hardening the alloy will ion this case have the alpha-plus-beta structure, whereas pre-hardening heating to a temperature above 1000° C. results in an excess growth of the beta-zirconium phase grains which affects noticeably processability of the alloy after hardening followed by annealing. In addition, higher-temperature heating involves extra electric power consumption, thus making the process less economic.

Hardening at a rate below 60° C results in a less finely laminated structure of the nonequilibrium alpha-zirconium phase with coarser interlayers of the residual beta-zirconium phase. In addition, some of the interlayers have had an opportunity to get fragmented so as to form lines of intermetallides which become larger upon the following annealing procedures, thus affecting the properties of the alloys. On the other hand, superhigh hardening rates (above 1000° C./s) fails to give further size reduction of the structure; that is why, from the standpoint of the economic feasibility of the process, quenching at such rates is inexpedient and hardly practicable.

Then annealing at a temperature of from 380° to 520° C. is carried out, which adds to the value of impact toughness of the hardened material up to 200–250 kJ/sq m, affects badly the strength characteristics and increases plasticity of the material. Such an annealing is followed by formation of a polygonal structure in some of the crystals (laminas) of the non-equilibrium alpha-zirconium phase. There are observed initial elongated laminas of said alpha-zirconium phase and some areas with diffuse fine-grained structure. Interlayers of the residual beta-zirconium phase between the laminas become less clear-cut and appear as if they are diffuse, and discontinuous in some individual places. No intermetallides are formed in case of such an annealing.

Annealing at a temperature below 380° C. fails to result in an appreciable increase in the reserve of technological plasticity of the hardened alloy, whereas annealing at a temperature above 520° C. d causes fragmentation of the interlayers of the beta-zirconium phase interlayers and formation of extended lines of intermetallides instead which result in microcracking under conditions of cold reduction at high ratios.

Then the billet thus annealed undergoes a once-through cold plastic working with a drawing ( ) of about 1.5–2.5 times and a percent reduction ( ) of 30–60. To obtain subsequently a more finely dispersed structure, it is preferable that said cold reduction be effected with maximum reduction ratios.

Said once-through cold plastic working of the billet is followed by an intermediate recrystallization alpha-annealing as a rule, at 540°–640° C. It is during such an alpha-annealing that recrystallization processes of the granular structure occur in the strained matrix, as well as formation of the particles off intermetallides and other second-phase segregates. The higher the degree of prestrain the more intensely proceed both of said processes even at a lower temperature of alpha-annealing. The result is the formation of a fine-grained alpha-zirconium matrix with finely divided secondphase particles, including intermetallides of the type of $Zr(Nb,Fe)_2$, $Zr(Nb,Cr,Fe)$, $(ZrNb)_3Fe$ which are arranged largely in lines at the places of the original interlayers of the beta-zirconium phase.

The cold reduction and alpha-annealing operations are as a rule repeated three or four times in succession depending on the range of products produced. It is due to alternation of the reduction and recrystalization that the alpha-zirconium matrix of the material becomes more fine-grained, while lineage (banded) arrangement of the second-phase particles is eliminated.

Thus, the final product exhibits a completely recrystallized structure of the alpha-zirconium matrix having a grain size principally in the range of from 3 to 5 m and featuring uniformly distributed therein particles of the ferriferous intermetallides sized mainly under 0.1 m, with interparticle distance of 0.20–0.40 μm, and density of 15–25 $m^{-2}$, the type $Zr(Nb,Fe)_2$, $Zr(Nb,Cr,Fe)$, $(Zr,Nb)_3Fe$ intermetallides amount to more than 60 vol. % of a total amount of said particles.

Such a homogeneous and fine-dispersed structure is responsible for a high level of plasticity, breaking strength and corrosion-resistance of the material of the product made use of in the core of a nuclear reactor.

When the proportion of the intermetallides of the type of $Zr(Nb,Fe)_2$, $Zr,Nb)_3Fe$ in a total amount of the second-phase particles is below 60 vol. %, a great number of particles of undesirable phases will be in the structure of the material, such as $ZrFe_3$ or the beta-niobium phase which are of a larger size. As a result, the ferriferous particles of the second phase will as a whole be distributed in the alpha-zirconium matrix with the interparticle distance over 0.40 m, whereby corrosion-resistance of the material be affected adversely.

Distribution of the ferriferous particles with the interparticle distance over 0.40 m occurs when the material is alloyed with Fe in an amount below 0.3 wt. %.

When Zr is alloyed with Nb, Fe, and Cr above the upper limit of content of said components in the proposed material, the interparticle distance of the material of the product produced, according to the proposed process, may be below 0.20 m, while the products with a such a structure suffer from a reduced characteristics of plasticity, breaking strength, and creep.

To promote understanding of the present invention given below are some specific exemplary embodiments thereof.

EXAMPLE 1

An ingot is made of a material containing, on a weight percent basis: 1.5 Nb; 0.9 Sn; 0.5 Fe; 0.005 Cr, 0.007 C; 0.06 O; 0.009 Si; the remainder being Zr, using the vacuum-arc melting process. The ingot is forged at a temperature from 1070° down to 900° C. with a fivefold reduction of the diameter. Next the forged blank is heated up to 1050° C. and water-quenched. Once the superficial gas-saturated layer has been removed the hardened blank is cut to specified lengths, holes are drilled in them, and the blanks are annealed at 620° C. Thereupon the holed specified-length blanks are subjected to press-forming at 620° C. with a tenfold drawing to obtain a tubular billet featuring a wall thickness of 5.5 mm and an outside diameter of 33 mm. Then the press-formed tubular billet is hardened from a temperature of 950° C. at a rate of about 100° C./s and annealed at 425° C. The annealed billets are subjected to cold working using the five-pass reduction rolling schedule with a total reduction percent of about 50 (as for wall thickness and diameter) at the first and subsequent rolling passes and intermediate annealing procedures at 620° C. Final annealing following cold rolling is carried out at 580° C. Finishing operation over, finished pipes are obtained having an outside diameter of 9.15 mm and a wall thickness of 0.65 mm.

EXAMPLE 2

The process is carried out as in Example 1, the sole difference being that the material consists of, on a weight percent basis: 0.8 Nb; 1.0 Sn; 0.6 Fe; and 0.01 Cr, annealing before hot pressing is conducted at 650° C., beta-hardening of the press-formed tubular billet is effected from 900° C. at a rate of 500° C./s, and annealing, at 380° C.

EXAMPLE 3

The process is carried out as in Example 2, the sole difference being that the material consists of, on a weight percent basis: 1.0 Nb; 0.3 Fe; 0.04 C; and 0.007 Si; annealing before hot pressing is conducted at 520° C., beta-hardening of the press-formed tubular billet is effected from 1100° C. at a rate of 1000° C./s, and annealing, at 520° C.

EXAMPLE 4

The process is carried out as in Example 3, the sole difference residing in that the material consists of, on a weight percent basis: 1.5 Sn; 0.15 Cr, and 0.006 C., annealing before hot pressing is conducted at 380° C., beta-hardening is effected from 1000° C. at a rate of 60° C./s, and annealing, at 450° C.

EXAMPLE 5

The process is carried out as in Example 4, the sole difference residing in that the material consists of, on a weight percent basis: 1.3 Sn; 0.005 Cr; 0.005 Si; and 0.01 O, annealing before hot pressing is conducted at 620° C., no beta-hardening of the press-formed tubular billet is effected but the latter is annealed at 650° C.

EXAMPLE 6

The process is carried out as in Example 4, the sole difference residing in that the material consists of, on a weight percent basis: 1.2 Sn; 0.4 Fe; 0.008 Cr; 0.005 C: 0.005 O; and 0.15 Si; no annealing before hot pressing is carried out.

EXAMPLE 7

The process is carried out as in Example 6, the sole difference residing in that the material contains 0.05 wt. % Si, the press-formed tubular billet is not subjected to beta-hardening and is annealed at 520° C.

EXAMPLE 8

The process is carried out as in Example 7, the sole difference being in that the material consists of, on a weight percent basis: 0.5 Nb; 1.0 Sn; 0.3 Fe; 0.2 Cr; 0.01 C; and 0.15 O; annealing of the press-formed tubular billet being effected at 380° C.

Data on the content of components and the conditions of operations of the proposed process for all the examples mentioned above are tabulated in Table 1, while structural and performance characteristics of the semifinished products and finished piping and tubing are presented in Table 2. Breaking strength was assessed against the impact toughness values of the material before the first cold rolling procedure and against the presence of microcracks thereafter, which is also characteristic of the reserve of technological plasticity of the material.

Microstructure of the material of the finished products was assessed against the size of a major proportion of the second-phase particles (intermetallides), an average inter-particle distance, and the proportion of the particles of $Zr(Nb,Fe)_2$ $Zr(Nb,Cr,Fe)$, and $(Zr,Nb)_3Fe$ in a total amount of the second-phase ferriferous particles. Properties of the finished tubular products were judged by ductility (specific elongation) values of longitudinal specimens tested for tension, gain in weight of specimens in water of a digester exposed to a temperature of 400° C. for 72 hours and that of 350° C. for 3000 hours, rate of creep at a temperature of 350° C. and a load of 100 MPa for 3000 hours, and against the grain radiation growth strain resulting from exposure of the test specimens to radiation until formation of a fluence of $5.4 \ 10^{26} \ m^{-2}$ (E 0.1 MeV).

As can be seen from the examples stated before, use of the proposed material and process for producing products therefrom provides for formation of a homogeneous structure therein, featuring a fine-dispersed and uniform distribution of the second-phase particles in said material, over 60 vol. % of said phase being the particles of intermetallides $Zr(Nb, Fe)_2$, $Zr(Nb,Cr,Fe)$, and $(Zr,Nb)_3Fe$. As a result of formation of such a microstructure the material of the product features high breaking strength, higher plasticity and corrosion-resistance, high resistance to grain radiation growth, and low rate of creep.

For the sake of comparison Examples 9 and 10 (Tables 1 and 2) illustrate a pipe production process carried out according to a known process technique (U.S. Pat. No. 4,649,,023, the prototype). According to Example 9, such a processing underwent the material having a high Fe content, and according to Example 10, the material with a low Fe content.

Absence of annealing before the first cold rolling procedure of the high Fe-content alloy (Example 9) results in formation of microcracks, so that all the products thus produced were rejected upon being subjected to flaw detection. Characteristics of the second-phase particles, corrosion resistance, rate of creep, and radiation growth strain in Example 10 is appreciably worse than in the proposed material processed according to the disclosed process.

Industrial Applicability

The present invention can find most utility when used for making products applied in the core of nuclear reactors. Furthermore, said material can be used in the chemical and medical industries, as well as in some other fields of engineering and technology, wherein high corrosion resistance, ductility, breaking strength, long-term strength, and high radiation resistance are required.

TABLE 1

| Example No 1 | Content of components, wt. % | | | | | | | Temperature of annealing before hot pressing, °C. 9 | Beta-hardening conditions | | Temperature of annealing before first cold rolling pass, °C. 12 |
|---|---|---|---|---|---|---|---|---|---|---|---|
| | Nb 2 | Sn 3 | Fe 4 | Cr 5 | C 6 | O 7 | Si 8 | | temperature, °C. 10 | quenching rate, °C./s 11 | |
| 1 | 1.5 | 0.9 | 0.5 | 0.005 | 0.007 | 0.06 | 0.009 | 620 | 950 | 100 | 425 |
| 2 | 0.8 | 1.0 | 0.6 | 0.01 | 0.007 | 0.06 | 0.009 | 650 | 900 | 500 | 380 |
| 3 | 1.0 | 1.0 | 0.3 | 0.01 | 0.04 | 0.06 | 0.007 | 520 | 1100 | 1000 | 520 |
| 4 | 1.0 | 1.5 | 0.3 | 0.15 | 0.006 | 0.06 | 0.007 | 380 | 1000 | 60 | 450 |
| 5 | 1.0 | 1.3 | 0.3 | 0.005 | 0.006 | 0.01 | 0.005 | 620 | — | — | 650 |
| 6 | 1.0 | 1.2 | 0.4 | 0.008 | 0.005 | 0.05 | 0.15 | — | 1000 | 60 | 450 |
| 7 | 1.0 | 1.2 | 0.4 | 0.006 | 0.005 | 0.05 | 0.05 | — | — | — | 520 |
| 8 | 0.5 | 1.0 | 0.3 | 0.2 | 0.01 | 0.15 | 0.05 | — | — | — | 380 |
| 9 | 1.0 | 1.0 | 0.5 | 0.005 | 0.005 | 0.05 | 0.005 | — | 1000 | 100 | — |
| 10 | 1.0 | 1.0 | 0.1 | 0.005 | 0.005 | 0.05 | 0.005 | — | 1000 | 100 | — |

TABLE 2

| | Properties of semifinished products | | | Characteristics of second-phase particles in material of finished pipes | | |
|---|---|---|---|---|---|---|
| Example No 1 | Impact strength of tubular billet before 1st cold rolling pass, kJ/sq.m 2 | Presence of micro-cracks after 1st cold rolling pass 3 | Size of major proportion of particles, m 4 | Average inter-particle distance, m 5 | Proportion of particles of $Zr(Nb,Fe)_2$ $Zr(Nb,Cr,Fe)$, $(Zr,Nb)_3Fe$ in total amount of second-phase particles, vol. % 6 | |
| 1 | 220 | no | 0.1 | 0.23 | 80 | |
| 2 | 200 | no | 0.1 | 0.23 | 80 | |
| 3 | 210 | no | 0.1 | 0.24 | 75 | |
| 4 | 225 | no | 0.09 | 0.22 | 85 | |
| 5 | 180 | no | 0.15 | 0.30 | 60 | |
| 6 | 230 | no | 0.1 | 0.23 | 70 | |
| 7 | 175 | no | 0.13 | 0.28 | 65 | |
| 8 | 160 | no | 0.11 | 0.26 | 80 | |
| 9 | 100 | yes | — | — | — | |
| 10 | 120 | no | 0.1 | 0.45 | 50 | |

| | Properties of material of finished pipes | | | | |
|---|---|---|---|---|---|
| | Specific elongation | Gain in weight in digester water, mg/sq.dm | | Rate of creap at 350° C. and = | Radiation growth strain at a fluence |
| Example No 1 | in axial direction, % 7 | 400° C., 72 h 8 | 350° C., 3000 h 9 | 100 MPa for 3000 h, $10^{-5}$ %/h 10 | of $5.4 \cdot 10^{-26}$ $m^{-2}$ (E 0.1 MeV) % 11 |
| 1 | 44 | 17.8 | 40.2 | 1.7 | 0.30 |
| 2 | 44 | 17.4 | 39.5 | 1.6 | 0.27 |
| 3 | 43 | 18.5 | 42.1 | 1.4 | 0.32 |
| 4 | 45 | 17.0 | 38.4 | 1.3 | 0.35 |
| 5 | 36 | 20.7 | 57.1 | 1.8 | 0.35 |
| 6 | 47 | 18.0 | 41.3 | 1.3 | 0.38 |
| 7 | 38 | 19.6 | 48.2 | 1.6 | 0.43 |
| 8 | 40 | 18.8 | 44.1 | 1.2 | 0.40 |
| 9 | — | — | — | — | — |
| 10 | 46 | 23.1 | 65.3 | 3.5 | 0.60 |

We claim:

1. A zirconium-based material, consisting essentially of, on a weight percent basis:
   0.5 to 1.5 Nb,
   0.9 to 1.5 Sn,
   0.3 to 0.6 Fe,
   0.005 to 0.2 Cr,
   0.005 to 0.04 C,
   0.05 to 0.15 O,
   0.005 to 0.15 Si,
   the remainder of said material being Zr;
   a microstructure of said material incorporates particles of iron containing intermetallides selected from the group consisting of
   $Zr(Nb,Fe)_2$,
   $Zr(Fe,Cr,Nb)$, and
   $(Zr,Nb)_3Fe$;
   particles of said iron containing intermetallides constitute at least 60 volume percent of a total amount of the iron containing intermetallides;
   said particles of said iron containing intermetallides being distributed over the volume of said material at an interparticle distance of from 0.2 to 0.4 μm.

2. A shaped article for use in the core of a nuclear reactor and comprising a zirconium-based material from which said product is made, said material consisting essentially of, on a weight percent basis:
   0.5 to 1.5 Nb,
   0.9 to 1.5 Sn,
   0.3 to 0.6 Fe,
   0.005 to 0.2 Cr,
   0.005 to 0.04 C,
   0.05 to 0.15 O,
   0.005 to 0.15 Si,
   the remainder of said material being Zr;
   a microstructure of said material incorporates a zirconium matrix strengthened with particles of the iron containing intermetallides;
   said particles of the iron containing intermetallides being selected from the group consisting of
   $Zr(Nb,Fe)_2$,
   $Zr(Fe,Cr,Nb)$, and
   $(Zr,Nb)_3Fe$;
   said particles constituting at least 60 volume percent of a total amount of particles of the iron containing intermetallides;
   said particles of said iron containing intermetallides being distributed over the volume of said material at an interparticle distance of from 0.2 to 0.4 μm.

3. A process for producing products for use in the core of nuclear reactor and comprising a zirconium-based material from which said product is made, said material consisting essentially of, on a weight percent basis:
   0.5 to 1.5 Nb,
   0.9 to 1.5 Sn,
   0.3 to 0.6 Fe,
   0.005 to 0.2 Cr,
   0.005 to 0.04 C,
   0.05 to 0.15 O,
   0.005 to 0.15 Si,
   the remainder of said material being Zr;
   a microstructure of said material incorporates a zirconium matrix strengthened with particles of iron containing intermetallides;
   said particles of the iron containing intermetallides being selected from the group consisting of
   $Zr(Nb,Fe)_2$,
   $Zr(Fe,Cr,Nb)$, and
   $(Zr,Nb)_3Fe$;
   constitute at least 60 volume percent of a total amount of particles of the iron containing intermetallides;
   said particles of said iron containing intermetallides being distributed over the volume of said material at an interparticle distance of from 0.2 to 0.4 μm;
   a process for producing said products having said microstructure comprises the following steps:
   making an ingot from said material;
   subjecting said ingot to beta-treatment;
   hot-forming of said beta-treatment ingot at an alpha-zirconium existence temperature to obtain a hot-formed billet;
   annealing said hot-forming billet at a temperature of from 380° C. to 650° C. to provide an annealed billet;
   mechanically treating said annealed billet by a multi-stage cold forming to provide a mechanically treated billet;
   subjecting said billet to an intermediate annealing at an alpha-zirconium existence temperature between the stages of said cold forming; and
   finishing said mechanically treated billet to obtain a finished product.

4. A process according to claim 3, comprising
   annealing of said beta-treated ingot at a temperature of from 380° C. to 650° C. prior to subjecting said billet to said hot forming.

5. A process according to claim 3, comprising
   hardening said hot-formed billet from a temperature of 900° C. to 1100° C. before said annealing of the billet following said hot forming;
   said annealing after said hot forming at a temperature of from 380° C. to 520° C.

6. A process according to claim 4, comprising
   hardening said hot-formed billet from a temperature of 900° C. to 1100° C. before said annealing of the billet following said hot forming;
   said annealing after said hot forming at a temperature of from 380° C. to 520° C.

7. A process according to claim 5, comprising
   hardening of said billet at a rate of from 60° C./s to 1000° C./s.

8. A process according to claim 6, comprising
   hardening of said billet at a rate of from 60° C./s to 1000° C./s.

* * * * *